(12) United States Patent
Terada et al.

(10) Patent No.: US 7,174,391 B2
(45) Date of Patent: Feb. 6, 2007

(54) METHOD FOR RESPONDING TO SITE ACCESS

(75) Inventors: Toshihito Terada, Hamura (JP); Kazumasa Morichika, Ome (JP); Toshio Tohara, Ome (JP); Masaaki Fukumura, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 692 days.

(21) Appl. No.: 09/867,180

(22) Filed: May 29, 2001

(65) Prior Publication Data

US 2001/0049748 A1 Dec. 6, 2001

(30) Foreign Application Priority Data

Jun. 2, 2000 (JP) .............................. 2000-165707

(51) Int. Cl.
G06F 15/16 (2006.01)
(52) U.S. Cl. ...................... 709/246; 709/203; 709/217; 709/227; 709/228; 709/229
(58) Field of Classification Search ................ 709/200, 709/201, 202, 203, 246, 228, 217, 227, 229
See application file for complete search history.

(56) References Cited

U.S. PATENT DOCUMENTS 5,815,665 A * 9/1998 Teper et al. ................. 709/229
6,463,459 B1 * 10/2002 Orr et al. .................... 709/203
6,615,251 B1 * 9/2003 Klug et al. .................. 709/218

FOREIGN PATENT DOCUMENTS

JP 11-212999 8/1999
WO WO 00/19323 4/2000

OTHER PUBLICATIONS

Japanese Patent Office Action (Notification of Reasons For Rejection) mailed Jun. 13, 1006 and English translation thereof.
Hideyuki Yamada, "Basic of Security (II) Remote Access, Learning Security of Remote Access from Actual Setup File," Nikkei Open System, Nikkei Business Publications Inc., Feb. 15, 1997, No. 47, pp. 285 to 299.

* cited by examiner

Primary Examiner—William Vaughn
Assistant Examiner—Barbara Burgess
(74) Attorney, Agent, or Firm—Frishauf, Holtz, Goodman & Chick, P.C.

(57) ABSTRACT

Site access method enables to use support system site with a sense that the user accesses site which he or she uses daily when access is made via the accounting office site. The method enables the user to recognize the use of the support system on the side of the site which the user daily uses and enabling the side of the service provider to enjoy the benefit obtained through the expansion of usage by new users. When access to the support system site from the user terminal is access via the accounting office affiliated with the site, the support system site generates page information for the accounting office by changing the name of the service provider of the page information of the support system into the accounting office name or the like to transmit this generated page information to the user terminal of the accounting office site.

3 Claims, 16 Drawing Sheets

FIG.3

SCREEN EXAMPLE OF MEMBER TERMINAL OF ACCOUNTING OFFICE "ABC"

| WELCOME TO THE HOME PAGE OF ACCOUNTING OFFICE "ABC" |
|---|

○ INTRODUCTION OF BUSINESS

○ GUIDE TO LOCATION

○ SEMINAR

○ LINKS

✳ ✳ ✳ ✳ ✳ ✳ ✳ ✳ ✳ ✳ ✳ ✳ ✳ ✳ ✳ ✳ ✳ ✳ ✳ ✳

◇ ENTERPRISE SUPPORT SYSTEM

○ WHAT IS ENTERPRISE SUPPORT SYSTEM

○ <u>TO ENTERPRISE SUPPORT SYSTEM</u>

HYPERTEXT TO ENTERPRISE SUPPORT SYSTEM

FIG.4A

MEMBER USER INFORMATION TABLE

| USER NAME | USER ID | USER INFORMATION (COMPANY NAME, THE KIND OF BUSINESS...) |
|---|---|---|
| aa | idu001 | |
| ab | idu002 | |
| ac | idu003 | |
| | | |

ACCOUNTING OFFICE CONTROL TABLE

| CONTROL TABLE OF THE ACCOUNTING OFFICE |
|---|
| ACCOUNTING OFFICE ID |
| ACCOUNTING OFFICE NAME |
| LOGO OF THE ACCOUNTING OFFICE |
| CONSULTANT MAIL ADDRESS |

USER VERIFICATION TABLE

| USER NAME | PASSWORD | USER ID |
|---|---|---|
| aa | | idu001 |
| ab | | idu002 |
| ac | | idu003 |
| | | |

MEMBER USER INFORMATION TABLE (14)

| USER NAME | USER ID | USER INFORMATION |
|---|---|---|
| aa | | |
| ab | | |
| ac | | |

CONSULTANT GROUP REPRESENTATIVE MAIL ADDRESS

FIG.5B

ACCOUNTING OFFICE TABLE (15)

| OFFICE NAME | IDENTIFIER |
|---|---|
| OFFICE "A" | idja |
| OFFICE "B" | idjb |
| OFFICE "C" | idjc |

FIG.5C

USER VERIFICATION TABLE (16)

| USER NAME | PASSWORD | USER ID |
|---|---|---|
| aa | | |
| ab | | |
| ac | | |

FIG.5D

SESSION CONTROL INFORMATION TABLE (17)

- SESSION ID
- FLAG
- OFFICE ID
- USER ID

FIG.5E

TABLE GROUP OF ACCOUNTING OFFICE (18)

- MEMBER USER INFORMATION TABLE
- USER VERIFICATION TABLE
- ACCOUNTING OFFICE CONTROL TABLE

FIG.5F

USAGE TIME TABLE OF ACCOUNTING OFFICE (19)

| OFFICE NAME | USAGE TIME |
|---|---|
| A | |
| B | |
| C | |

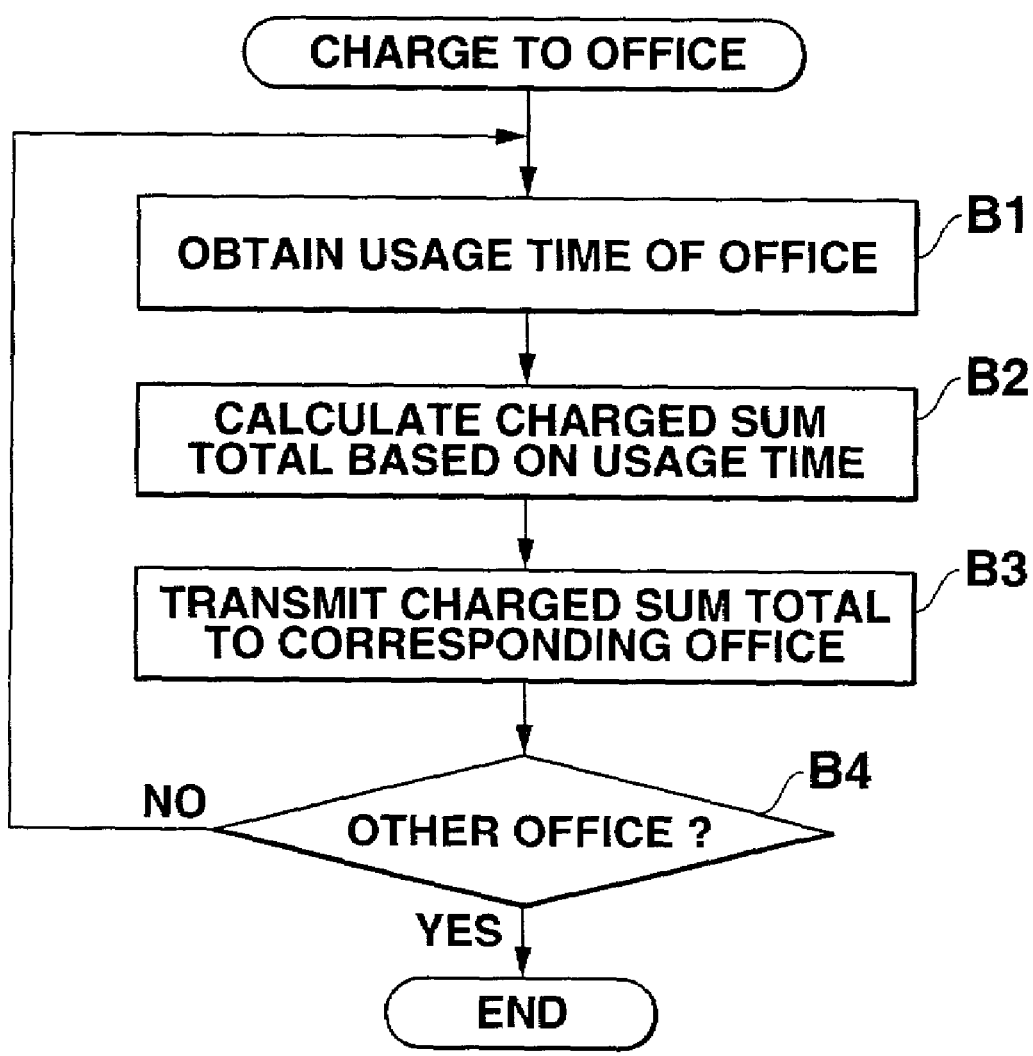

FIG.12A

EXAMPLE OF TOP SCREEN OF GENERAL MEMBERS

| ENTERPRISE SUPPORT SYSTEM | |
|---|---|
| ANNOUNCEMENT<br>METHOD OF USAGE<br>MEMBER STIPULATION<br>LOG-IN<br>USER ID [ ]<br>PASSWORD [ ] | ○ MANAGEMENT DIAGNOSIS<br><br>○ MANAGEMENT CONSULTATION<br><br>○ END |
| | PLEASE REFER TO XXXX FOR FURTHER INFORMATION |

FIG.12B

EXAMPLE OF TOP SCREEN OF MEMBERS OF ACCOUNTING OFFICE "ABC"

| ENTERPRISE SUPPORT SYSTEM OF ACCOUNTING OFFICE "ABC" | |
|---|---|
| ANNOUNCEMENT<br>METHOD OF USAGE<br>MEMBER STIPULATION<br>LOG-IN<br>USER ID [ ]<br>PASSWORD [ ] | ○ MANAGEMENT DIAGNOSIS<br><br>○ MANAGEMENT CONSULTATION<br><br>○ END |
| | PLEASE REFER TO ACCOUNTING OFFICE "ABC" FOR FURTHER INFORMATION |

FIG. 13A

EXAMPLE OF TOP SCREEN AFTER VERIFICATION
OF GENERAL MEMBERS

|  | TO "XYZ" TRADE INC. |
|---|---|
| ANNOUNCEMENT | |
| METHOD OF USAGE | ○ MANAGEMENT DIAGNOSIS |
| MEMBER STIPULATION | ○ MANAGEMENT CONSULTATION |
| LOG-IN | ○ END |
| USER ID  `mutk001` | |
| PASSWORD  `******` | |
|  | PLEASE REFER TO XXXX FOR FURTHER INFORMATION |

FIG. 13B

EXAMPLE OF TOP SCREEN AFTER VERIFICATION
OF ACCOUNTING OFFICE "ABC"

|  | TO "XYZ" TRADE INC. |
|---|---|
| ANNOUNCEMENT | |
| METHOD OF USAGE | ○ MANAGEMENT DIAGNOSIS |
| MEMBER STIPULATION | ○ MANAGEMENT CONSULTATION |
| LOG-IN | ○ END |
| USER ID  `mutk001` | |
| PASSWORD  `******` | |
|  | PLEASE REFER TO ACCOUNTING OFFICE "ABC" FOR FURTHER INFORMATION |

FIG.14

ENTERPRISE SUPPORT SYSTEM

CHECK SHEET OF DIAGNOSIS ON SOUNDNESS OF YOUR FIRM

(1) MANAGER

|   | YES | NEITHER | NO |
|---|---|---|---|
| 1. _____ ? | O | O | O |
| 2. _____ ? | O | O | O |
| 3. _____ ? | O | O | O |
| 4. _____ ? | O | O | O |
| 5. _____ ? | O | O | O |

(2) ORGANIZATION AND PERSONNEL AFFAIRS

|   | YES | NEITHER | NO |
|---|---|---|---|
| 1. _____ ? | O | O | O |
| 2. _____ ? | O | O | O |
| 3. _____ ? | O | O | O |
| 4. _____ ? | O | O | O |
| 5. _____ ? | O | O | O |

(3) MANAGEMENT INFORMATION CONTROL

．
．
．

(7) MANAGEMENT ENVIRONMENT

．
．

(8) MARKETING

| TRANSMIT | CANCEL |

FIG.15

EVALUATION ADVICE SHEET OF GENRE

| DIAGNOSIS ON SOUNDNESS OF YOUR FIRMS | | | EVALUATION ADVICE OF GENRE |
|---|---|---|---|
| GENRE | | | ONE-POINT ADVICE |
| 1 | MANAGER | | · PRESIDENT HIMSELF SHOULD RECOGNIZE THAT .... |
| | C | 7/10 | · CHARISMATIC ELEMENT IS INDISPENSABLE FOR .... |
| | | | ⋮ |
| 8 | MARKETING | | |
| | D | 4/10 | |
| GENERAL | ISSUE OF WARNING | | · THE FIRM FACES MANAGEMENT CRISIS, IT IS URGENT TO INSPECT MEASURES FOR ... |
| | D | 43/80 | · A CLEAR MANAGEMENT PLAN AND A CONTROL CAPACITY FOR ... |

DIAGNOSIS RESULT OF SOUNDNESS OF FIRMS

IN THE MANAGEMENT OF ENTERPRISES, THE MOST IMPORTANT REQUIREMENT IS THE VALUE OF THE MANAGER. ALTHOUGH OTHER ITEMS ARE IMPORTANT, THE IMPROVEMENT OF THE QUALITY OF THE MANAGER SEEMS....

FIG.16A

ENTERPRISE SUPPORT SYSTEM    TO "XYZ" TRADE INC.

CONSULTATION SHEET

TITLE:PROCUREMENT OF CAPITAL

CONSULTATION CONTENTS:

FREE FORMAT

TRANSMIT

FIG.16B

ENTERPRISE SUPPORT SYSTEM OF ACCOUNTING OFFICE "ABC"    TO "XYZ" TRADE INC.

CONSULTATION SHEET

TITLE:PROCUREMENT OF CAPITAL

CONSULTATION CONTENTS:

FREE FORMAT

TRANSMIT

METHOD FOR RESPONDING TO SITE ACCESS

CROSS-REFERENCE TO RELATED APPLICATIONS

This application is based upon and claims the benefit of priority from the prior Japanese Patent Application No. 2000-165707, filed Jun. 2, 2000, the entire contents of which are incorporated herein by reference.

BACKGROUND OF THE INVENTION

The present invention relates to a method for responding to a site access to a service provider site when a service provider site providing useful service is accessed by a user.

Along with a substantial prevalence of the Internet, the number of WWW (World Wide Web, hereinafter referred to as Web) sites begins to increase on the Internet. When a URL (Uniform Resource Locator) which is a unique address allocated for respectively specifying a Web site on the Internet is input to an address enter column of a Web browser incorporated in the terminal, the Web browser can specify and directly access the Web site based on the law of the URL to receive the corresponding Web page from the Web site. That is, the user is required to directly access the target site in order to receive the service on the Internet.

The fact that the Web page is specified based on the specification of the URL and desired service is obtained means that customers can make a direct access to the Web site of the trading partners to receive various kinds of service even in an electronic commercial trade in which enterprises provide product sales and service to general customers, in addition to trade between enterprises in which not only a data exchange for placing and receiving orders is simply made on the Internet but also an exchange is made on the Internet over the whole commercial trade such as advertisement, contracts and settlement of accounts.

However, in the commercial trade in an actual society, with an increase in the number of organizations such as enterprises or the like which are cooperating with or affiliated with other enterprises, there can be seen a tendency that such cooperation and affiliation relationship as a whole is evaluated as the capability of the enterprise itself. Thus, a plurality of enterprises are affiliated with each other as business partners so that the enterprises are widely cooperating with each other in a mutually compensating manner in their respective fields of specialty. As a consequence, both enterprises will make a progress, and a reliability with customers will be more secured. The application of such a situation to the Internet service as it is becomes an important issue in the development of the electronic commercial trade from now on.

However, as seen from the side of customers, even with respect to other enterprises which are cooperating or affiliated with the trading enterprises which have established reliability relationships with the customers over a long years, those business partner enterprises of the trading enterprises are in the position of the third party which is not a direct trading enterprise. The actual situation of the enterprises is not necessarily grasped, so that in many cases, there is a worry in conducting the actual commercial trade by making a direct access to business partners of the trading enterprises without conducting a reliability survey on enterprises. Furthermore, introduction from the trading enterprises to the enterprises which are related with their own business partners is likely to give to customers an impression that such introduction is merely an mediation and conciliation in which the capability of enterprises is questioned even when the enterprise and the trading enterprise have a mutually compensating relationship.

Consequently, affiliation between mutually compensating enterprises becomes a large merit for the side of business entities providing Internet service, but the affiliation has an aspect which cannot be emotionally accepted as seen from the side of customers of the business entities.

On the other hand, there arises a problem in that in the network environment in which a large-scale service provider site providing useful service on a nation-wide scale on the Internet and a small-scale service provider site providing the same kind of service on a regional or an individual level are present, a large scale advertisement activity is required for allowing large-scale service providers to newly incorporate customers who have established a reliability relationship with small-scale service providers through a long-year trade relationship or for allowing small-scale service providers to newly incorporate customers who have established reliability relationship through a long-year trade relationship with large-scale service providers so that a large amount of time and labor is required to obtain customers and the like.

BRIEF SUMMARY OF THE INVENTION

Accordingly, the present invention is directed to a method that substantially obviates one or more of the problems due to limitations and disadvantages of the related art.

In accordance with the purpose of the invention, as embodied and broadly described, the invention is directed to an access method for sending contents information provided by a service provider site after changing a part of the contents information to a part corresponding to the contents information provided by an affiliated site when a service provider site providing useful service is accessed via the affiliated site affiliated with the service provider site.

Another object of the present invention is to provide a site access method for conducting user verification by using user registration information on the affiliated site when the service provider site is accessed via the affiliated site affiliated with the service site at the time of user verification on the service provider site providing useful service.

Still another object of the present invention is to provide a site access method which enables to use a service provider site with a sense that a user accesses to a site which he or she daily uses by changing part of contents information provided by a service provider to corresponding information out of the contents information of the specific site at the time of conducting specific processing based on information received from the user associated with the contents information provided by the service provider site providing useful service upon being accessed and requested.

In order to attain the above object, the site access method according to the first aspect of the present invention sends to a requester page information by adding information of the specific site provided by the service provider site when an access request is made to the service provider site providing useful service via the specific site affiliated with the site, so that even the user member of the specific site can use the service of the service provider site with a sense that the user retrieves the site which he or she uses daily, and the service can be recognized as one item of the service of the specific site. The service provider site can enjoy the benefit by expanding the usage by new members.

In order to attain another object of the present invention, the site access method according to the second aspect of the present invention performs user verification by using user registration information registered with the specific site when an access request is made via the specific site affiliated with the service provider site at the time of user verification to the user which makes an access request at the service provider site providing useful service, so that registered member of the affiliated specific site can use the service and the user registration information of the specific site is not required to be obtained at each time of user verification, and the user verification in the specific site can be executed in place of the service provider site. The service provider site can enjoy the benefit by expanding the usage by new members.

In order to attain still another object of the present invention, the site access method according to the third aspect of the present invention can realize at the service provider site processing which is not contradictory to daily processing contents executed by the specific site because the processing contents are changed depending on whether or not the access request is made to the service provider site via the specific site affiliated with the service provider site. The service provider site can enjoy the benefit by expanding the usage by new members.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a view illustrating a top page screen of an accounting office site at the user terminal;

FIG. 4A shows a member user information table stored and controlled at an accounting office site;

FIG. 4B shows an accounting office control table stored and controlled at the accounting office site;

FIG. 4C shows a user verification table stored and controlled at the accounting office site;

FIG. 5A shows a member user information table stored and controlled at a support system site;

FIG. 5B shows an accounting office table stored and controlled at the support system site;

FIG. 5C shows a user verification table stored and controlled at the support system site;

FIG. 5D shows a session control information table stored and controlled at the support system site;

FIG. 5E shows a table group 18 for accounting offices stored and controlled at the support system site 1;

FIG. 5F shows a usage time table for accounting offices stored and controlled at the support system site;

FIG. 11 is a flowchart showing a processing in the case where the usage fee is charged as a cost to the accounting office in accordance with the situation providing management diagnosis service;

FIG. 12A shows an example of a top page screen at the user terminal in the case where the support system member accesses the support system site;

FIG. 12B shows an example of a top page screen at the user terminal in the case where the accounting office member accesses the support system site;

FIG. 13A shows an example of a top page screen at the user terminal in the case where the support system member accesses the support system site after the verification is performed;

FIG. 13B shows an example of the top page screen at the user terminal in the case where the accounting office member accesses the support system after the verification is performed;

FIG. 14 shows an example of a management diagnosis check sheet screen at the user terminal;

FIG. 15 shows an example of an advice sheet screen at the user terminal;

FIG. 16A shows an example of a management consultation sheet screen at the user terminal in the case where the support system member accesses the support system site; and FIG. 16B shows an example of a management consultation sheet screen at the user terminal in the case where the accounting office member accesses the support system site.

DETAILED DESCRIPTION OF THE INVENTION

A preferred embodiment of a site access method according to the present invention will now be described with reference to the accompanying drawings.

Hereinafter, a first embodiment of the present invention will be explained by referring to FIG. 1 to FIG. 16B.

Figure 1:
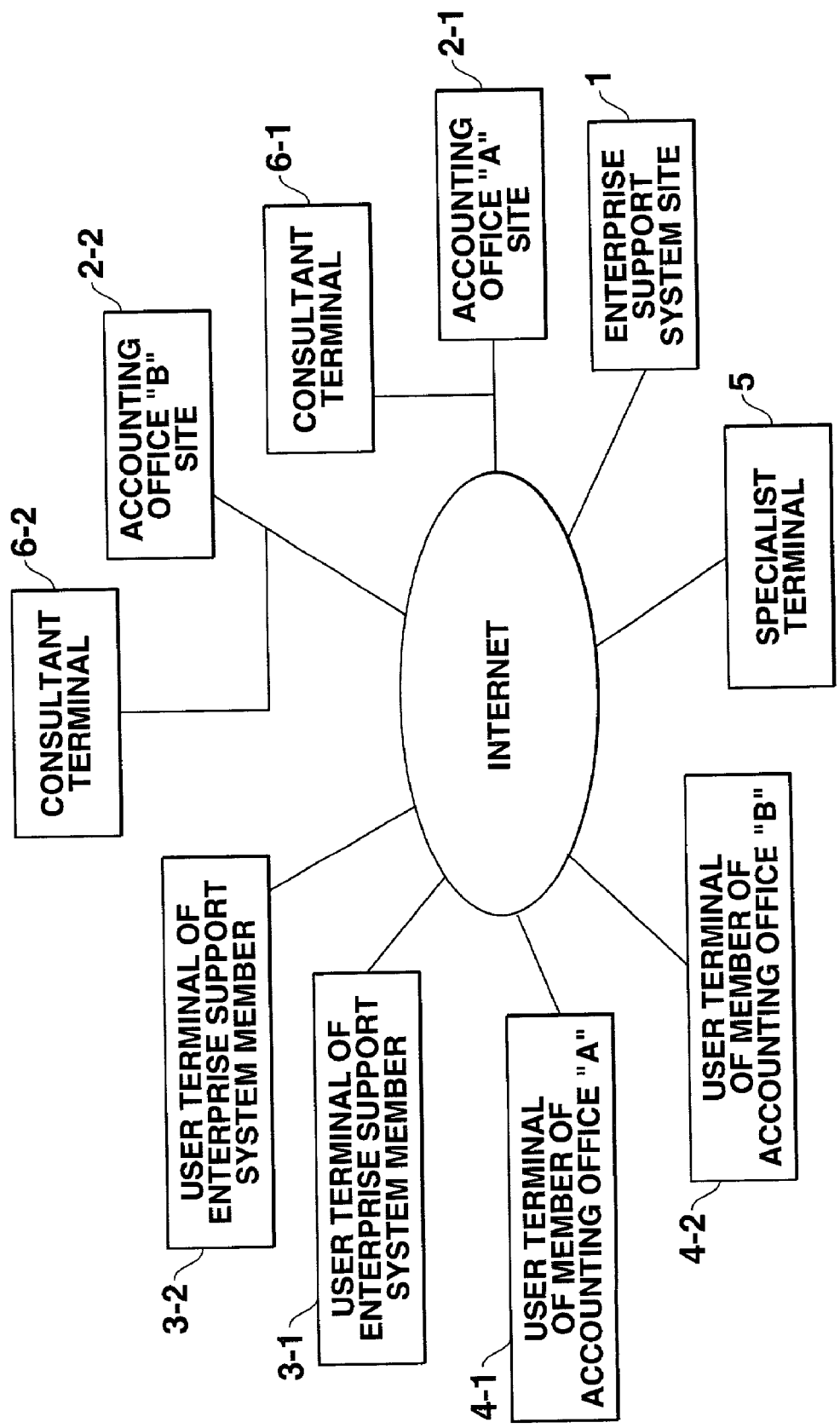
FIG. 1 is a block diagram showing the whole enterprise support system.

FIG. 1 is a block diagram showing an overall structure of an enterprise support system according to the first embodiment.

This enterprise support system provides a management diagnosis service for diagnosing with a computer the management state of the enterprise. In principle, it is pay service for providing pay enterprise diagnosis. This service is a system for realizing new service which anyone can use when using the Internet.

The management diagnosis service provided by the enterprise support system can be used by member users of the accounting office affiliated with service business entities in addition to general member users of the support system who are registered as members in order to receive the service.

In this enterprise support system, a service provider site (an enterprise support system site) 1 managed by the service business entities, sites (accounting office sites) 2-1, 2-2, . . . of accounting office "A", accounting office "B", . . . affiliated with this enterprise support system site 1, user terminals 3-1, 3-2, . . . of the general members of this enterprise support system, and user terminals 4-1, 4-2, . . . of the accounting office members are connected via the Internet. Incidentally, in this embodiment, the site shows a server computer for providing service and a system as a whole having the server computer as its core, and is capable of conducting various kinds of processing in accordance with the application software in addition to the collection control of various kinds of information.

Furthermore, in this embodiment, a specialist terminal 5 installed at customers of the support system for enabling management consultation by the specialist team as one item of management diagnosis service and consultant terminals 6-1, 6-2, . . . installed at the customers consultant of each accounting office are connected via the Internet.

Figure 2:
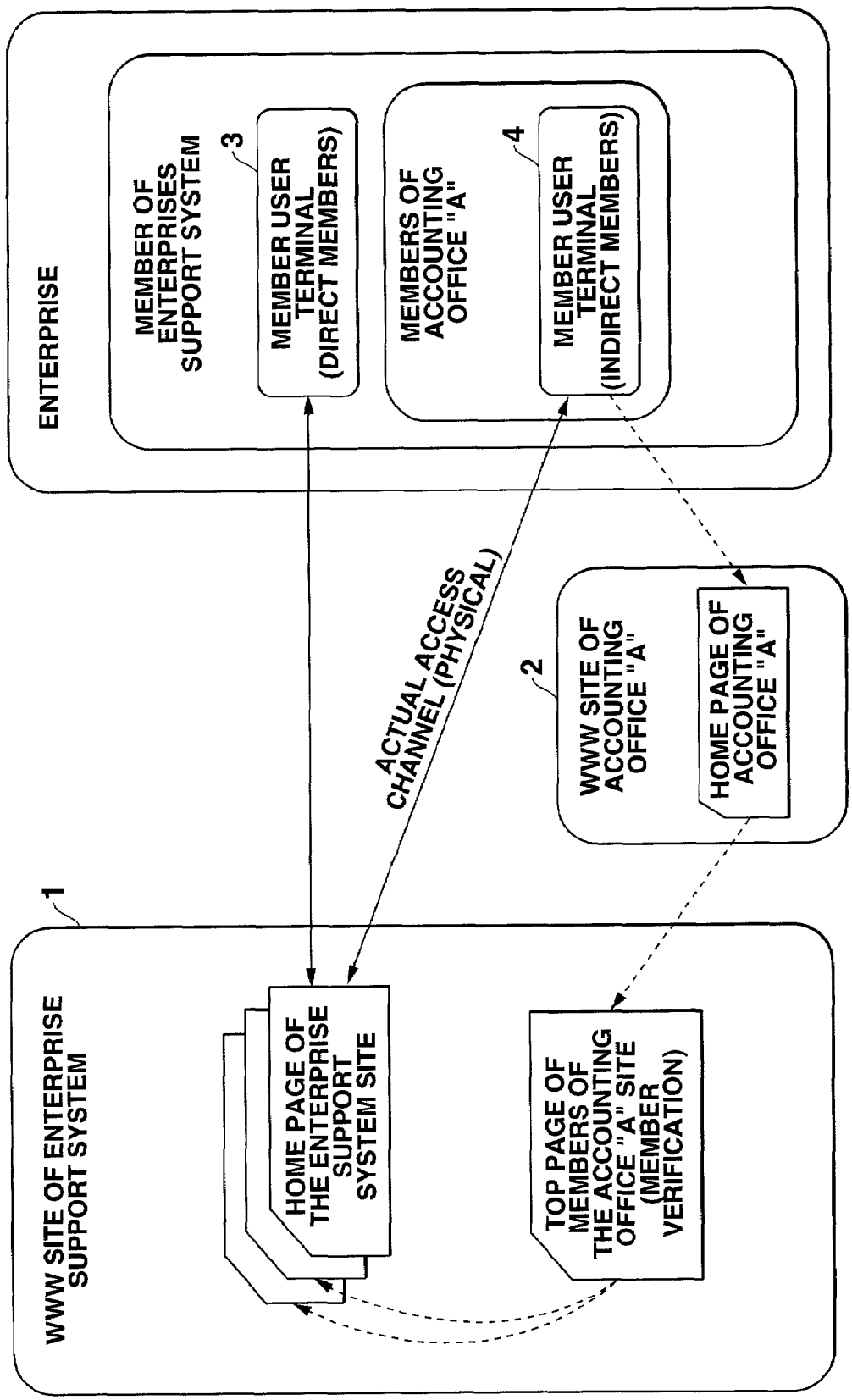
FIG. 2 shows an access channel between the enterprise support system site and each of user terminals.

FIG. 2 is a view schematically showing an access channel between the enterprise support system site 1, the accounting office site 2 and user terminals 3 and 4.

The management diagnosis service is provided to the accounting office member when the enterprise support system is directly accessed from the user terminal 3 of the general members of the support system while providing the management diagnosis service to the accounting office members even in the case where the enterprise support system site 1 is accessed from the user terminal 4 of the accounting office members via the accounting office site 2. In such a case, when the general members of the support system are direct members, members of the accounting office are treated as indirect members with respect to the enterprise support system.

The accounting office members accesses the site 2 from the user terminal 4 by designating an URL for specifying the accounting office site 2 which they usually use in their daily life. Then, the top page information is sent to the user terminal 4 from the accounting office site 2 and is displayed. If enterprise support system 1 and the accounting office 2 are affiliated with each other, the top page information corresponding to the screen shown in FIG. 3 (described later) is sent to the user terminal 4 to be displayed. This top page information includes a hypertext "to the enterprise support system". When the hypertext is selected out of the displayed top page information, the accounting office site 2 accesses the support system site 1.

FIG. 3 shows an example of a top page screen of the accounting office in this case. On this top page screen, introduction information of the "enterprise support system" is also displayed in addition to the introduction information of the accounting office. In the introduction information to the support system, the hypertext "to the enterprise support system" for linking to the support system site 1 is included.

When the hypertext "to the enterprise support system" is designated on the top page screen of the accounting office at the user terminal, the accounting office site 2 accesses the support system site 1. At that time, an identifier of the accounting office is added to the hypertext. The support system site 1 determined whether or not an access is made via the accounting office site 2 based on the determination as to whether this hypertext includes the identifier of the accounting office. When the access is made not via the accounting office site 2, the Web page in the support system site 1 directed by the hypertext is provided. On the other hand, when the access is made via the accounting office site 2, the management diagnosis service is provided by establishing a connection with the user terminal 4 of the accounting office members. At that time, the management diagnosis service is provided as one item of the service of the accounting office. The support system site 1 conducts the three items of processing shown hereinbelow to allow the accounting office members to recognize the site.

When the site is accessed via the accounting office site 2, contents showing that the Web page is provided by the site out of the Web page contents provided by the support system site 1 are changed, for example, to contents showing that the source providing the contents is the accounting office to transmit the changed Web page to the user terminal 4 at the requester who is a member of the accounting office.

When an access is made via the accounting office site 2, and the user verification of the person accessing the site is executed, the accounting office site is accessed to conduct the user verification by referring to the user registration information in the site.

When a consultation request with specialists and consultants is received from the accounting office members, at the time of transmitting the consultation contents to the specialist or consultants, an address to which the mail is transmitted is changed when the request is made via the accounting office site 2 to transmit the mail to the consultant who is an advisor of the accounting office.

FIGS. 4A to 4C are views showing a data structure of various kinds of tables which constitute database connected to a server computer arranged inside of the accounting office site 2. FIG. 4A shows a member user information table 11, FIG. 4B shows an accounting office control table 12, and FIG. 4C shows a user verification table 13.

The member user information table 11 (FIG. 4A) stores and controls the user information from the user terminal desiring the service of the accounting office as member information by each user, which is data for one record. Each member record comprises respective items such as a "user name", a "user ID", and "user information". Incidentally, the user information includes the company name, the kind of business, the representative name, and the responsible person name.

The accounting office control table 12 (FIG. 4B) stores and controls the "consultant mail address" in addition to the "accounting office ID", the "accounting office name", and the "logo of the accounting office" as control information of the accounting office. The "accounting office ID" is an identifier of the office. For example, "idja" is an identifier of accounting office "A" allocated by the support service site 1 when affiliated with the business entity operating the support service site 1. Furthermore, the consultant mail address is a mail address to the consultant of advisories on the side of the accounting office.

The user verification table 13 (FIG. 4C) stores verification information for verifying whether or not an access is made from a regular member. The "user name", the "password", and the "user ID" are stored and controlled as verification information for each member of the accounting office.

FIGS. 5A to 5F are views showing various kinds of tables stored and controlled in the memory device of the support system site 1. This memory device corresponds to the memory device 22 of FIG. 6. FIG. 5A shows a member user information table 14. FIG. 5B shows an accounting office table 15. FIG. 5C shows a user verification table 16. FIG. 5D shows a session control information table 17. FIG. 5E shows one of a table group 18 for accounting offices. FIG. 5F shows one of a usage time table group 19 for the offices.

The member user information table 14 (FIG. 5A) stores and controls user information from the user terminal desiring a service of the support system site 1 as member information for each member with a member record comprising respective items such as the "user name", the "user ID" and the "user information". Furthermore, the member user information table 14 stores and controls the "consultant group representative mail address" addressed to the specialist consultant team which is the customer of the support system.

The accounting office table 15 (FIG. 5B) stores and controls the identifiers "idja", "idjb", and "idjc" for identifying each of the accounting office sites corresponding to accounting office "A", accounting office "B", accounting office "C", . . . When the identifier of the accounting office is added to the URL which is access information in the case where the accounting office table 15 is accessed from the user terminal 4, the support system site 1 refers to the identifier of the accounting office in the accounting office table 15 in order to determine which accounting office site the access is made via.

The user verification table 16 (FIG. 5C) stores and controls the user name, the password, and the user ID as verification information for each member of the support system site 1.

The session control information table 17 (FIG. 5D) stores and controls the session ID, the via-office flag, the office ID, and the user ID as the current session control information. The via-office flag is a flag which is turned on in the case where an access is made via the accounting office site 2.

The table group 18 of the accounting office (FIG. 5E) stores and controls by the accounting office the each of the files of the above member user information table 11, the accounting office control table 12, and the user verification table 13 which are registered at each of the accounting offices obtained from each of the accounting office site 2. The table group 18 is a table group which is set and registered by the support system site 1 operated by the provider by making a request to the sites of the affiliated accounting office to obtain each of the table files described above from each of the accounting offices after an affiliation relationship is established between the support service provider and the accounting office.

The usage time table 19 of the office (FIG. 5F) stores and controls by the accounting office the usage accumulation time in which the members use the management diagnosis service. The usage time table 19 is referred to for the calculation of the usage fee when the management diagnosis service is charged to each of the accounting offices in accordance with the usage accumulation time.

Figure 6:
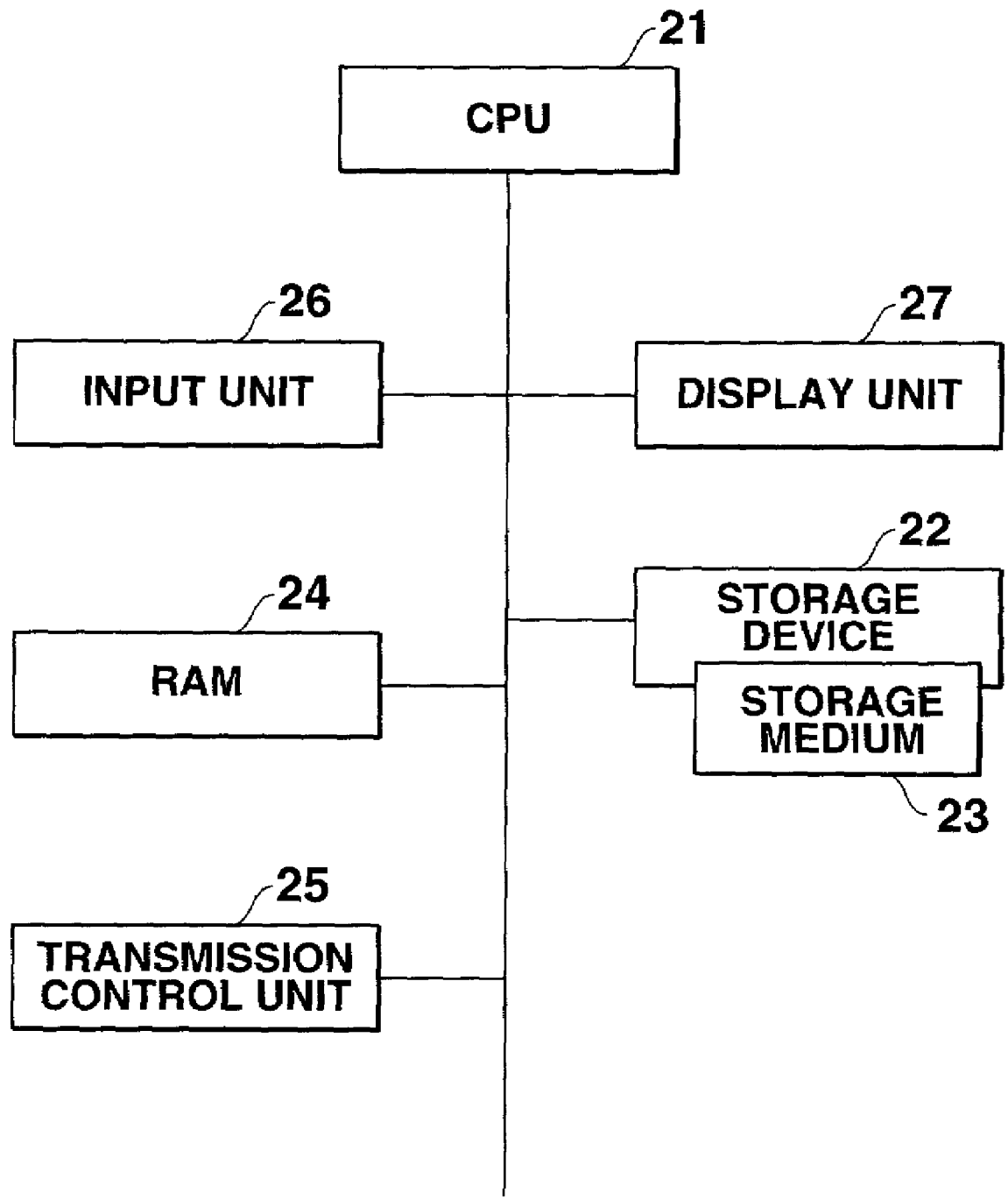
FIG. 6 is a block diagram showing the whole support system site.

FIG. 6 is a block diagram showing an overall structure of a server computer at the support system site 1.

A CPU 21 is a central processing unit for controlling an overall operation of the support system site 1 in accordance with the operating system and various kinds of application software in the memory device 22. The memory device 22 stores database, character font or the like including an operating system, various kinds of application software and various kinds of tables shown in FIGS. 5A to 5F, and has a storage medium 23 constituted of magnetic, optical and semiconductor memories or the like and the drive system thereof. This storage medium 23 is a fixed medium such as a hard disc or the like, or a mobile medium such as a detachably attachable CD-ROM, a floppy disc, a RAM card and magnetic card or the like. Furthermore, the program, and data in the storage medium 23 is loaded in the RAM 24 by the control of the CPU 1 when needed, or is saved in the storage medium 23. Furthermore, the storage medium 23 may be provided on the side of the external device. The CPU 21 can be used by directly accessing the program/data in this storage medium 23 via a transmission medium.

Furthermore, the CPU 21 incorporates a part or the whole of the program or data stored in the storage medium 23 from the side of the other devices via a transmission medium and the CPU 21 is capable of newly registering or additionally registering the program or the data in the storage medium 23. That is, the program/data sent from the other devices constituting a computer communication system via the wired transmission channel such as communication circuit, a cable or the like or a wireless transmission channel such as electronic wave, micro wave, infrared ray or the like can be installed inside of the storage medium 23 with the transmission control unit 25. Furthermore, the program/data may be stored and controlled at the side of the external device such as a server. The CPU 21 can directly access the program/data on the side of the external device via the transmission medium.

On the other hand, to the CPU 21, the transmission control unit 25, the input unit 26 and the display unit 27 which are the input and output peripheral device are connected via the bus line. Consequently, the CPU 21 control the operation thereof in accordance with the input and output program. The transmission control unit 25 is a communication interface including, for example, communication modem, infrared ray module, an antenna or the like. Furthermore, the transmission control unit 25 is connected to the Internet to be operated as a WWW server. The input unit 26 is an operation portion constituting a pointing device such as a keyboard, a touch panel, a mouse, a touch input pen or the like to input a character string data and various kinds of commands.

Next, an operation of the support system site 1 in this embodiment will be explained by referring to flowcharts shown in FIGS. 7 to 11. Here, a program for realizing each function described in these flowcharts is stored in the storage medium 3 in the form of a computer readable program code name. The CPU 21 consecutively executes processings in accordance with this program code. Furthermore, the CPU 21 can also consecutively execute processings in accordance with the above program code sent via the transmission medium. That is, in addition to the storage medium, the program/data supplied from the external site via the transmission medium is used to execute processings of this embodiment.

FIGS. 7 to 11 are flowcharts showing an operation of the enterprise support system site 1 at the time of an access from the user terminal of the general members or accounting office members.

(1) Access Processing Operation from General Members (Direct Members)

In the beginning, an operation when an access is made from general members will be explained.

Figure 7:
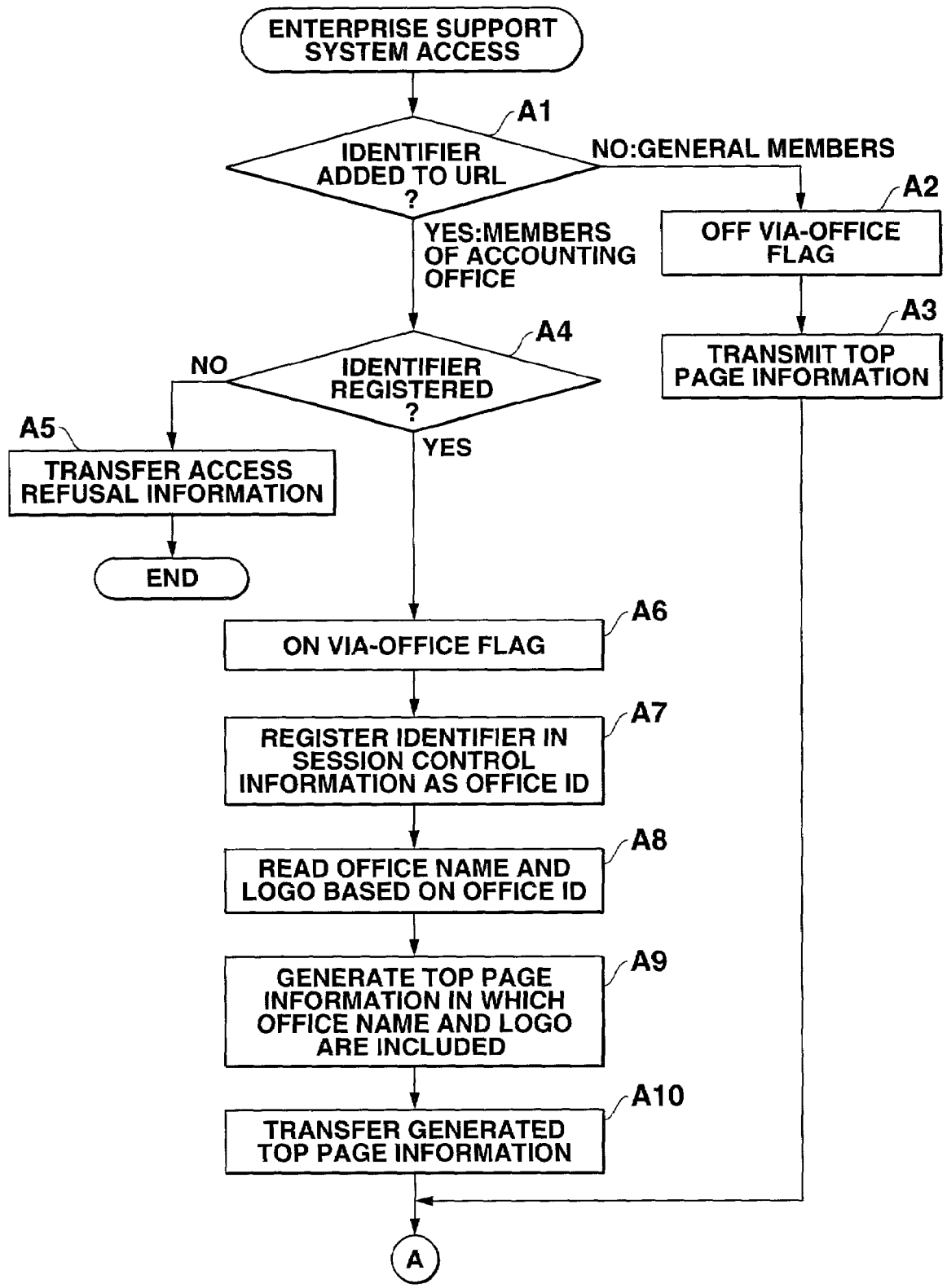
FIG. 7 is a flowchart showing an operation at the time of access to the enterprise support system site from a user terminal.

When the enterprise support system site 1 is accessed from general members, it is determined whether or not an identifier of the accounting office is added to the access information (URL)(step A1 of FIG. 7). If an access is made from general members, the identifier of the accounting office is not added to the URL. If the identifier of the accounting office is not added, the via-office flag in the session control information table 17 is turned off (step A2) followed by transmitting the top page information of the support system site 1 to the user terminal 3 of the general members.

FIG. 12A shows an example of a top page screen in which the user terminal 3 of the general members displays the top page information received from the site 1. On a part of the header on the top page screen for general members, the "enterprise support system" is displayed as a service provider name. There are included two boxes for inputting a "user ID" and a "password" as log-in information in addition to an "announcement", a "method of usage", a "member stipulation", a menu item, namely a menu item for specifying a request for "management diagnosis", a menu item for specifying a request for "management consultation" with a consultant, and a menu item for specifying an "end" of service. On the bottom portion, there is displayed a service business name of an enterprise support system showing a section to which inquiry is made.

Figure 8:
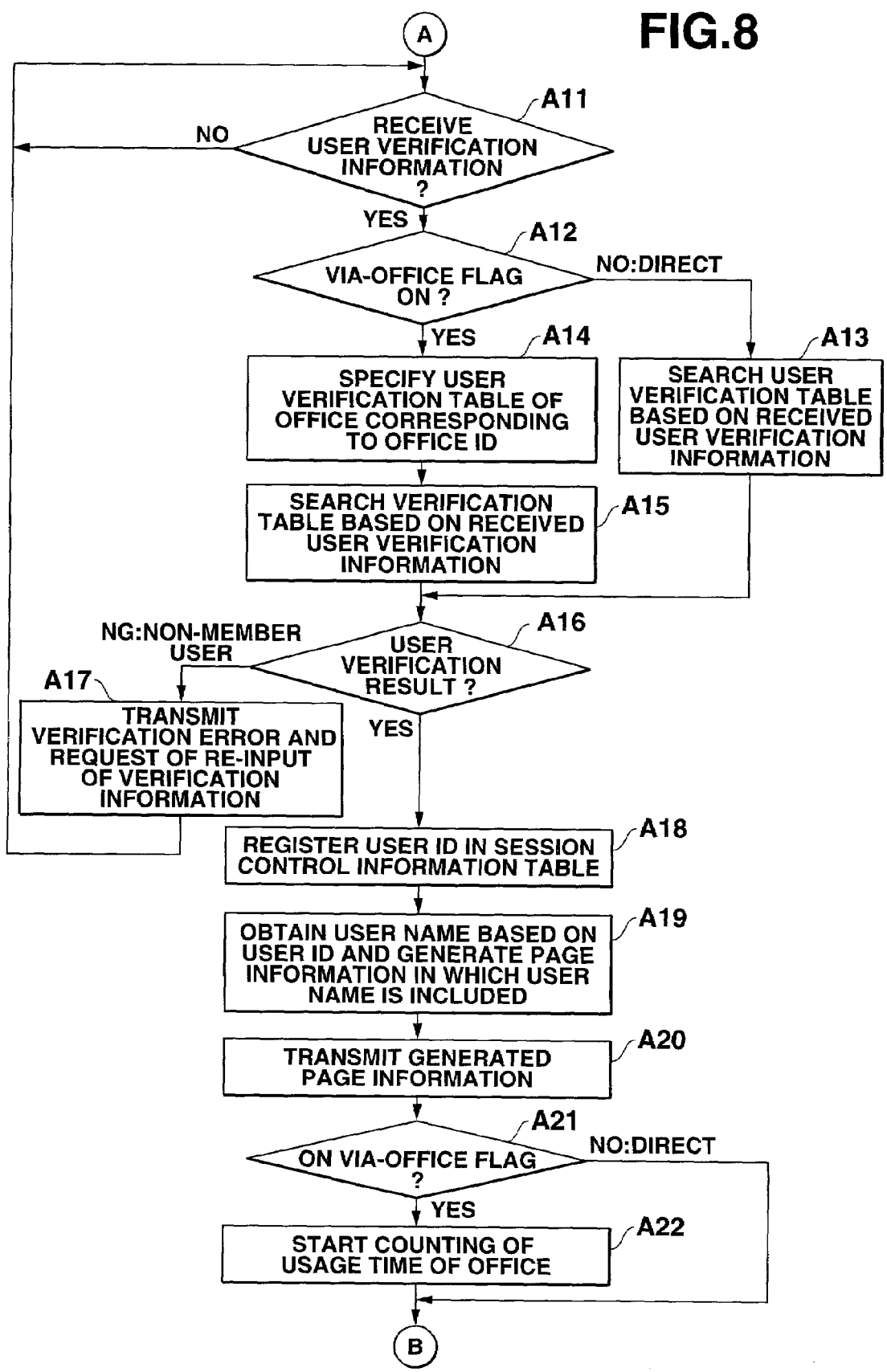
FIG. 8 is a flowchart showing an operation at the time of an access to the support system site following FIG. 7.

After the display of the top page at step A3, the process proceeds to step A11 of FIG. 8 to be set to a wait state until verification information comprising an input of the user ID, and the password to a box on the top page screen by member users is transmitted. Here, when the user verification information is received, it is determined the ON/OFF state of the via-office flag in the session control information table 17 (step A12). When the flag is turned off (step A12: No), the user verification table 16 is retrieved based on the received user verification information to determine whether or not the user is a member registered at the table.

As a result of the user verification, when no registered member exits who corresponds to the user verification information, that is, when the user is a non-member user (step A16: NG), the process is set to a state of waiting for the transmission of the user verification information (step A11) after sending the verification error and a request of re-input of verification information (step A17) so that the re-input of the user information is promoted.

On the other hand, when the user is a regular member (step 16: OK), the user ID is extracted out of the received user verification information so that the user ID is registered in the session control information table 17 (step A18). Then, based on the registered user ID, the member user information table 14 is retrieved to obtain the corresponding user name, prepare a page dedicated to the requested user member in which the user name is added to a predetermined location portion of the top page of the support system displayed on the screen of the user terminal 3 (step A19) and transmit the generated page to the user terminal 4 of the accounting office members who are a requester (step A20).

FIG. 13A shows an example of a page screen of the menu item transmitted from the support service site after the verification of a general member and displayed on the user terminal of the general members. In addition to the contents of the top page screen shown in FIG. 12A, at the header portion, the "user name" (here, XYZ Trade Inc.) of the general member who accesses the enterprise support system as well as the "enterprise support system" is displayed.

After the menu item page is transmitted, ON/OFF of the via-office flag of the session control information table 17 is judged (step A21). Here, since an access is made from general members, the flag is turned off (step A21: No) to proceed to step A25 to provide a state in which management diagnosis processing can be executed.

Next, the wait state is continued until a request for the processing menu is made from the user terminal 3 (step A26). In the case where the menu is selected for designating the execution of the management diagnosis by the user (step A26: Yes), the management diagnosis check sheet page indicated by the hypertext added to the management diagnosis item is read (step A27). Then, ON/OFF of the via-office flag is judged (step A28). Here, since the flag is turned off (step A28: No), the management diagnosis check sheet page is transmitted to the requestor (step A30).

As shown in FIG. 14, the screen displaying the management diagnosis check sheet page is a list sheet in which standard inquiry items classified for each genre over the whole management activities are allowed to correspond to the item response columns. In this case, the five items of inquiry are described for each of eight kinds of genres, namely, "managers", "organizations and personal affairs", "management information control", "financial affairs control", "financial affairs index", "management environment" . . . . Then, in the response column of each of the items, a description form is adopted for marking by classifying the present situation in accordance with the inquiry contents into three stages.

When response contents to this management diagnosis check sheet are received (step A31), this response contents are analyzed, and the diagnosis determination processing is executed for performing a diagnosis determination for each genre (step A32). That is, the response contents corresponding to each of the items by the genre will be represented in the points. The points are counted by the genre, and the sum total of the points is determined as an evaluation point by the genre.

Then, an advice sheet is prepared as a diagnosis with respect to the management diagnosis check sheet based on the evaluation point by the genre (step A33).

FIG. 15 shows an example of this advice sheet in which the document information corresponding to the diagnosis result is allocated for each genre while the document information is allocated and arranged as a general commentary. That is, the advice sheet has a structure in which an advice column of the genre, the general advice column, and finally the general commentary column are arranged. In the advice column of the genre, and the general advice column, an evaluation level corresponding to the evaluation points is added out of five stage evaluation levels "A" (excellent characteristic), "B" (favorable level), "C" (thorough control), "D" (warning issue), and "E" (thorough renovation) in addition to the evaluation points (10 stage evaluation).

Then, after this advice sheet is transmitted to the user who request the diagnosis (step A34), the process returns to step A25 to wait for the request of the following menu.

Figure 10:
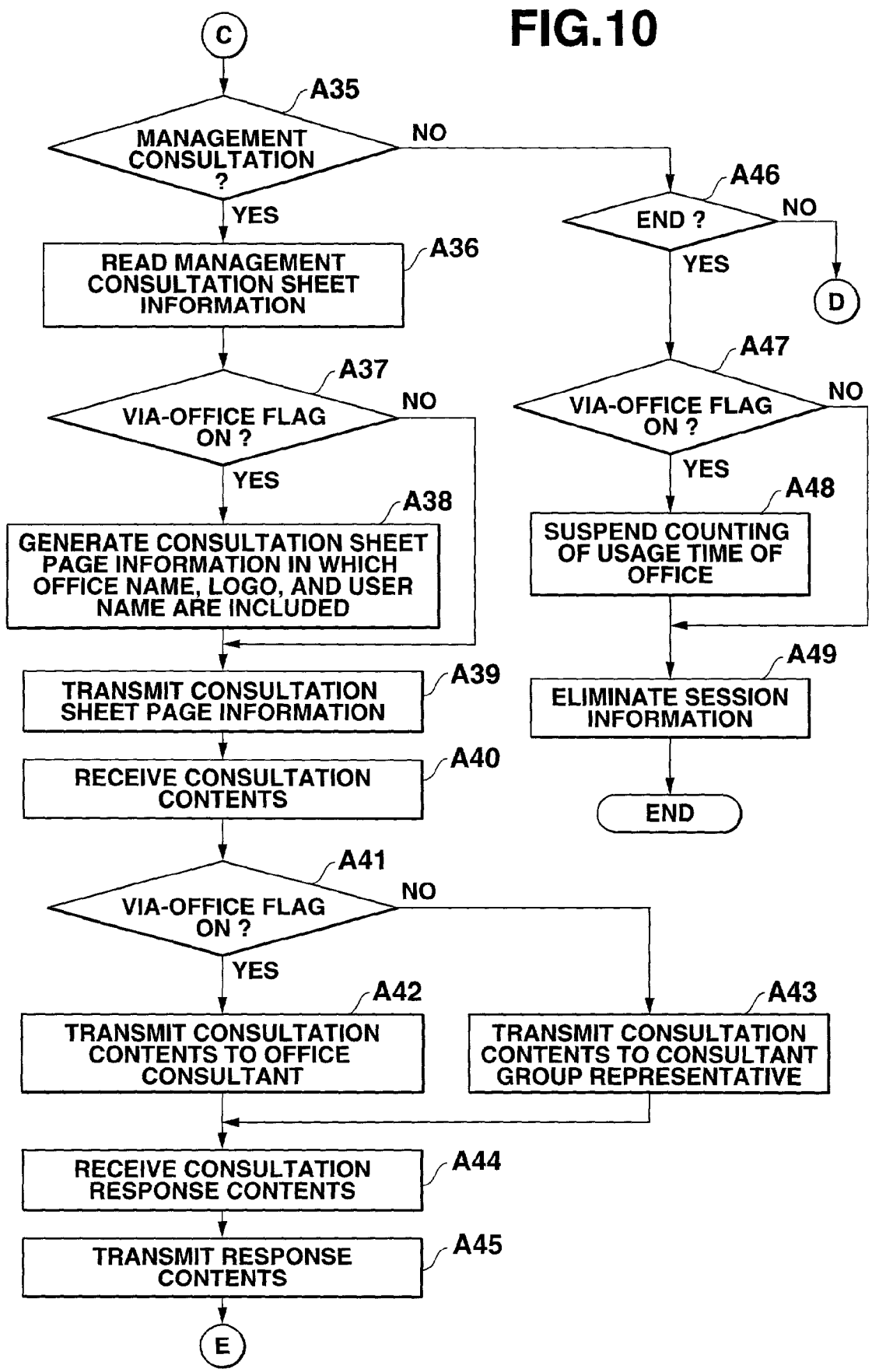
FIG. 10 is a flowchart showing an operation at the time of an access to the support system site following FIG. 9.

On the other hand, in the case where a processing menu request input from the user terminal 3 at step A25 is management consultation by the consultant instead of a management diagnosis (step A35 of FIG. 10: Yes), the management consultation sheet page shown in the hypertext embedded in the management consultation menu is read (step A36). Then, ON/OFF of the via-office flag is judged (step A37). Now, since the flag is turned off (step A37: No), the management consultation sheet page is sent to the requester (step A39).

FIG. 16A shows an example of a screen displaying a management consultation sheet page sent from the support service site 1 to the user terminal 3 in the case where a request of the management consultation is made from the general members. The management consultation sheet screen in this case is such that the name of the service provider "enterprise support system" is displayed as the header information. Furthermore, a box is added for inputting the input area of the consultation title and the consultation contents, and a transmission button is added for instructing the start of transmission.

When the consultation contents input to the box of such management consultation sheet screen are received from the user terminal 3 (step A40), ON/OFF of the via-office flag is judged (step A41). Since the flag is turned off now, the process proceeds to step A43 to read the "consultant group representative mail address" from the member user information table 14 and prepare an electronic mail having the received consultation contents as a body text thereof thereby transmitting the electronic mail addressed to the representative. Then, when the consultation response contents from the representative are received (step A44), the response contents are transferred by mail to the member user who requests the consultation (step A45). In this case, the support system site 1 functions as a mediator between general members and consultants.

After that, the process returns to step A25 to wait for the request of the following menu. Here, in the case where "end" is designated (step A46 of FIG. 10: Yes), ON/OFF of the via-office flag is judged. Since the flag is turned off (step A47: Yes), the process proceeds to step A49 to end the management diagnosis processing after the contents of the session control table 17 are deleted.

(2) Access Processing Operation by Members of the Accounting Office (Indirect Members)

Next, an operation will be explained in the case where an access is made by members of the accounting office, namely, the support system site 1 is accessed via the accounting office site 2.

In this case, when members of the accounting office directly access the accounting office site 2 which they use daily, the top page screen of the accounting office is displayed as shown in FIG. 3 on the user terminal 4. When the hypertext "to the enterprise support system" linked to the support system site 1 is designated with a pointing device such as a mouse (not shown) or the like, an identifier of the accounting office allocated from the site 1 is added to the URL accessing the support system site 1. For example, in the case of accounting office "A", an identifier "idja" is added.

When the URL to which such identifier is added is received (step A1 of FIG. 7: Yes), the accounting office table 15 is retrieved based on the identifier (step A4). In the case where the corresponding identifier is not registered in the table (step A4: No), it is determined that the accounting office is not a regular accounting office to transmit an access refusal page and ends the process due to an error (step A5). On the other hand, when the corresponding identifier is registered (step A4: Yes), it is determined that it is an access via the regular accounting office, the via-office flag in the session control information table 17 is turned on (step A6) followed by registering the identifier in the session control information table 17 as the office ID (step A7).

Then, the accounting office control table in the table group 18 by the accounting office is referred to based on the office ID to obtain the "office name" and the "logo" (step A8), generate the top page for the accounting office by adding the "office name" and the "logo" to the top page of the support system (step A9) and transmit this generated top page to the requester (step A10).

FIG. 12B shows an example of a screen on which the top page of the accounting office transmitted from the support system site 1 is displayed in the case where a request of the access is made from the accounting office members. In the service provider name as header information, the enterprise support system of the accounting office "ABC" is displayed as the accounting office name. Furthermore, on the inquiry place as the bottom information, "accounting office "ABC" is displayed. That is, this top page is generated by changing a part of the top page (source of service provider and inquiry place) for the support system site 1.

After this top page is transmitted to the user terminal 4 of the accounting office, the process proceeds to step A11 to wait for the receipt of the user verification information from the user terminal 4. Here, when the user verification information is received, ON of the via-office flag is judged at the next step S12 (step 12: Yes). The user verification table corresponding to the office in the table group 18 by the accounting office is specified based on the office ID (step A14). The verification table is retrieved based on the user verification information which is transmitted and the user verification is checked (step A15). That is, the verification check is executed by using the user verification table for the accounting office so that it is determined whether the user is a regular member of the office (step A16) to conduct processing in accordance with the determination result in the same manner as the case described above (steps A17, A18 to A20).

Then, at the next step A21, ON of the via-office flag is judged so that the counting operation is started after clearing the count value of the office usage time table 19 corresponding to the office (step A22).

Figure 9:
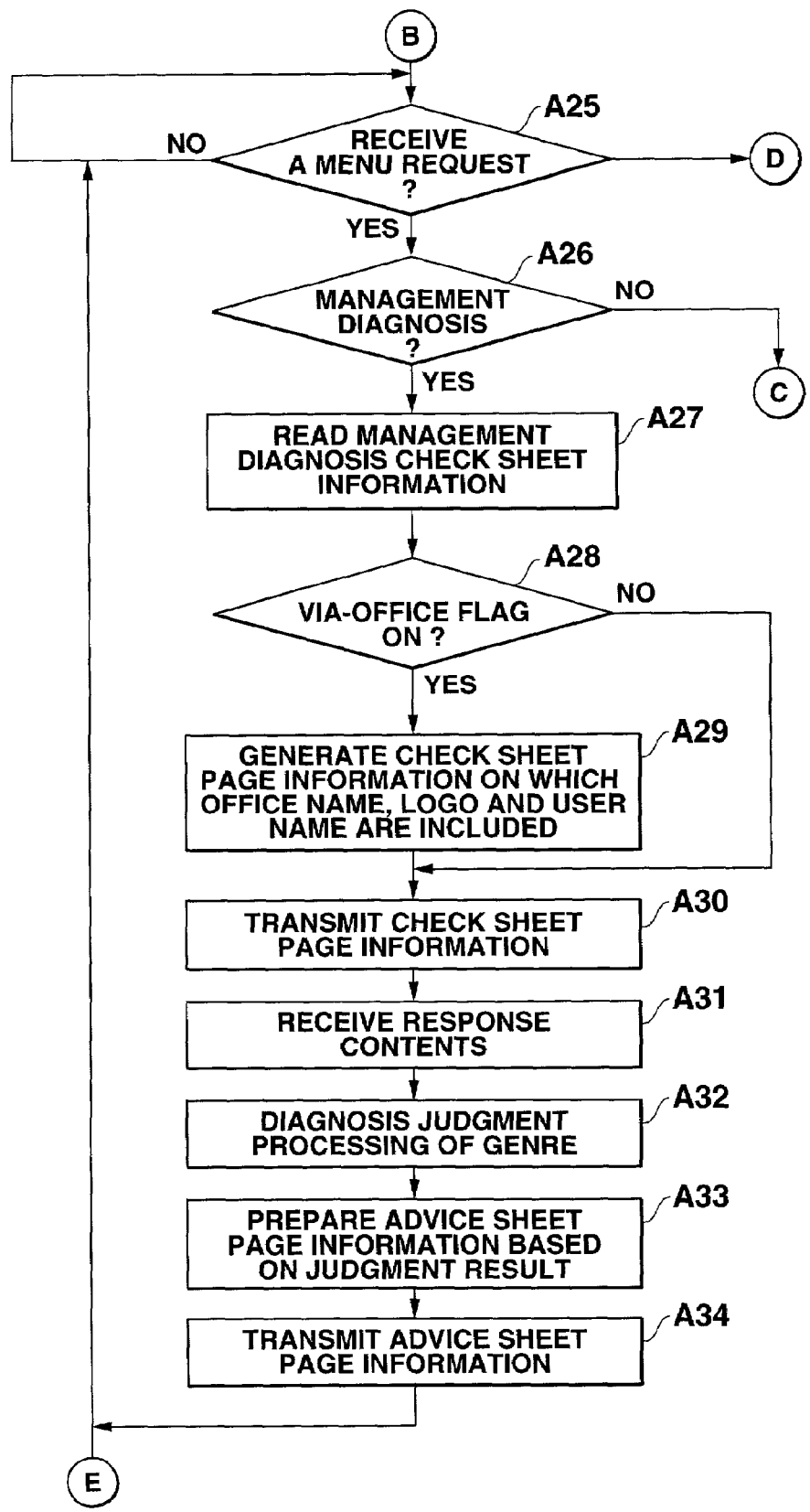
FIG. 9 is a flowchart showing an operation at the time of an access to the support system site following FIG. 8.

Then, the process proceeds to step A22 of FIG. 9 to provide a state in which the management diagnosis processing can be executed. In this case, when the management diagnosis menu is selected at the user terminal 4 (step A26), the processing of changing a part of the management diagnosis check sheet page and of sending the changed checked sheet is executed. That is, the management diagnosis check sheet page shown in FIG. 14 is read (step A27). The check sheet page added with the "office name", the "logo", and the "user name" at a predetermined position is generated (step A29), and this generated check sheet page is transmitted to the requester (step A30). Incidentally, when the check sheet page in this case has a display form for clarifying the "office name", the "logo", and the "user name", the display position is arbitrary. Hereinafter, in the same manner as the processing with respect to the general members, an advice sheet is prepared based on the response contents in accordance with each of the inquiries of the check sheet from the user terminal 4, and a processing of transmitting to the user terminal 4 is executed (steps A31 to A34).

Furthermore, in the case where management consultation by the consultant is requested from the user terminal 4 (step A35 of FIG. 10: Yes), the management consultation sheet page shown by the management consultation hypertext is read (step A36) so that the via-office flag is judged and the ON is detected in this case (step A37: Yes). Consequently, a part of the management consultation sheet page is changed to be transmitted to the user terminal 4. That is, the management consultation sheet screen shown in FIG. 16A is read (step A36) and the consultation sheet page is generated which is added at a predetermined position with the "office name", the "logo", and the "user name" to send the generated consultation sheet page to the user terminal (step A39).

FIG. 16B shows an example of a management consultation sheet screen displayed at the user terminal 4 based on the generated consultation sheet page. On the screen, the "enterprise support system of accounting office "ABC" is displayed as a service provider name. In addition, the "user name" of the accounting office member is displayed which requests the management consultation. Furthermore, in the same manner as FIG. 16A, a box for inputting the consultation contents is displayed.

Then, when the member of the accounting office who has received the consultation sheet page receives the consultation contents input in the box (step A40), the "accounting office control table" corresponding to the accounting office is specified from the table group 18 by the accounting office to read the "office consultant mail address" from the specific table. An electronic mail having the received consultation contents as a body text is prepared to send the electronic mail addressed to the consultant (step A42). Consequently, the consultation in this case is executed with respect to the adviser consultant of the accounting office. Then, when a response to the consultation contents is received from the adviser consultant of the accounting office (step A44), the response electronic mail is transmitted to the member user by mail (step A45).

Incidentally, in the case where the "end" instruction is given from the user terminal 4 (step A46), it is determined ON/OFF of the via-office flag of the session control information table 17 (step 47). Since the flag is turned on in this case (step A47: Yes), the contents in the session control information 17 are deleted (step A49) after the count operation of the usage time table 19 of the office is suspended (step A48).

Next, the processing operation of the service account will be explained.

FIG. 11 is a flowchart showing processing in the case where the usage fee is charged to the accounting office in accordance with the usage situation of the management diagnosis service.

When a designated day comes when the charged service account is processed, the count value is read from the front office in the office usage time table, for example, at the end of month (step B1) to calculate the sum total of the charged account in accordance with the count value (usage time) (step B2) to send the sum total of the charged account to the accounting office by mail (step B3). Hereinafter, until a charging procedure with respect to the accounting office is completed, the above operation is repeated (steps B1 to B4).

As has been described above, in this embodiment, it is determined whether the support system site is accessed via the accounting office site. In the case where the support system site is accessed via the accounting office, the page information for the accounting office is generated by changing a part of the page information of the support system, for example, the top page, the menu selection page, the management diagnosis check sheet page, the management consultation sheet page, and the generated page information is transmitted to the user terminal. Consequently, when the user is a member of the accounting office affiliated with the support system even in the case where the user is a non-member of the of the support system, this management diagnosis service can be used and it can be recognized that this management diagnosis service has been provided as one item of the service of the accounting office site 2 which is daily used. Furthermore, at the accounting office site 2, the useful management diagnosis service of the support system can be provided to the members so that the value of the whole accounting office can be heightened, reliable relationship with customers can be secured. Furthermore, for the service business entities providing the management diagnosis service, the accounting office members can be obtained with the result that the benefit by the expansion of the usage of the new member users can be enjoyed.

Through the affiliation of business partners of the service business entities and the accounting office, both the accounting office and the service business entities make a progress, and a reliable relationship between the accounting office and the member enterprise becomes more secured.

In this case, when it is determined whether an access to the support system site 1 is an access via the accounting office site, it is determined whether or not an identifier is added to the URL for identifying the accounting office. Thus, the determination can be executed with ease and with certitude without forcing the user to conduct a special operation. When the page information of the support system is changed to the page information for the accounting office, the accounting office name or the like is added so that the page information is not required to be obtained from the accounting office site 2 and the page of the accounting office can be generated with ease.

Furthermore, in the case where an access is made via the accounting office site 2, the usage accumulation time is stored and controlled by the accounting office and service fee in accordance with the usage accumulation time is charged to each accounting office with the result that the charging procedure can be automated.

Besides, the user registration information is stored and controlled for each of the members on the side of the support system, and the user registration information of the accounting office members is also stored and controlled. When the support system site 1 performs user verification, in the case where an access is made via the accounting office site 2, the user verification is executed based on the user registration information of the accounting office members, a regular member on the side of the accounting office can use the management diagnosis service. That is, it is not required to refer to the accounting office site 2 at every time of the user verification as to whether or not the user is a regular user. The user verification can be independently executed on the support system side.

Furthermore, in the case where processing is executed for transmitting by mail the consultation contents to the consultant at the time of receiving from the user a consultation request by the consultant after the top page is sent to the user terminal, when an access is made via the accounting office site 2, the contents of the mail transmission processing are changed so as to transmit the mail to the customers of the accounting office in order to enable the utilization of the support system site with a sense that the user accesses the accounting office site which he or she daily uses. Consequently, processing can be realized which is not contradictory to the contents of processing daily executed on the side of the accounting office site 2 so that the consultation contents can be transmitted to the customers of thee accounting office.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, in the case where an access is made via the accounting office site 2 in the above embodiment, the top page, the menu item page, the management diagnosis check sheet page, and the management consultation sheet page are changed to the page for the accounting office. However, the present invention is not limited to these screens. The "accounting office name", the "logo" and the like may be added to all the pages which are transmitted to the user terminal of the accounting office members by the support system site 1, and the "inquiry place" may be changed to the accounting office name.

The enterprise support system has been shown as an example, but the system can be the management diagnosis system including shops, hospitals, extra-curricular learning facilities, private business entities or the like.

If the site access is controlled depending upon whether or not the service provider site providing useful service is accessed via the affiliated site which is affiliated with the service provider site, the present invention can be applied to a general electronic commercial trade in addition to the management diagnosis system.

Furthermore, the present invention can be practiced as a computer readable storage medium recording programs for allowing the computer to realize predetermined functions.

What is claimed is:

1. A method for responding to access to a service provider site for providing contents information via a communication network in which the service provider site transmits, when an access request is made on a screen of an affiliation site from a requesting terminal of the affiliation site affiliated with the service provider site, contents information of the service provider site to the requesting terminal, the method comprising the steps of:

storing user verification information and an identifier of the affiliation site, which is affiliated with the service provider site, both in the affiliation site and in the service provider site;

transmitting an access request from the affiliation site to the service provider site with the identifier of the affiliation site when the affiliation site receives an access request from the requesting terminal;

determining, by the service provider site, whether the access request is made via the affiliation site based on whether the access request includes the identifier of the affiliation site;

changing, by the service provider site, a part of the contents information to be transmitted to the requesting terminal to predetermined contents information corresponding to the affiliation site when the access request is made via the affiliation site;

transmitting, by the service provider site, the contents information including the predetermined contents information to the requesting terminal and waiting for a user verification request from the requesting terminal before starting service provision; and storing, by the service provider site, user information of the requesting terminal relating to the service provision into a session control table relating to the affiliation site.

2. The method according to claim 1, further comprising the steps of:

accumulating a service usage time of the service provider site when the access request is made via the affiliation site; and determining a charge based on the accumulated service usage time every predetermined period of time and conducting a charging procedure to an enterprise of the affiliation site.

3. An article of manufacture comprising a computer usable storage medium having computer readable program code means stored therein for responding to access to a service provider site providing contents via a communication network in which the service provider site transmits, when an access request is made on a screen of an affiliation site from a requesting terminal of an affiliation site affiliated with the service provider site, contents information of the service provider site to the requesting terminal, the computer readable program code means comprising:

computer readable program code means for storing user verification data and an identifier of the affiliation site, which is affiliated with the service provider site, both in the affiliation site and in the service provider site;

computer readable program code means for transmitting an access request from the affiliated site to the service provider site with an identifier of the affiliation site when the affiliation site receives an access request from the requesting terminal;

computer readable program code for determining, by the service provider site, whether the access request made via a one of the affiliation sites based on whether the access request includes the identifier of the one of the affiliation sites;

computer readable program code means for changing, by the service provider site, a part of the contents information to be transmitted to the requesting terminal to predetermined information corresponding to the affiliation site when the access request is made via affiliation site;

computer readable program code means for transmitting, by the service provider site, the contents including predetermined contents information the requesting terminal and waiting for a user verification request from the requesting terminal before starting service provision;

computer readable program code means for storing, by the service provider site, user information of the requesting terminal relating to the service provision into a session control table relating to the affiliation site.

* * * * *